United States Patent
Xiao et al.

(10) Patent No.: US 9,079,260 B2
(45) Date of Patent: Jul. 14, 2015

(54) POLYCRYSTALLINE DIAMOND CUTTING TOOL WITH COATED BODY

(75) Inventors: Xingcheng Xiao, Troy, MI (US);
Michael J. Lukitsch, Marysville, MI (US); Anil K. Sachdev, Rochester Hills, MI (US); Leonid C. Lev, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1115 days.

(21) Appl. No.: 12/249,428

(22) Filed: Oct. 10, 2008

(65) Prior Publication Data

US 2009/0116913 A1 May 7, 2009

Related U.S. Application Data

(60) Provisional application No. 60/984,427, filed on Nov. 1, 2007.

(51) Int. Cl.
*B23B 51/00* (2006.01)
*B23D 77/02* (2006.01)

(52) U.S. Cl.
CPC .......... *B23D 77/02* (2013.01); *B23D 2277/061* (2013.01); *B23D 2277/245* (2013.01); *B23D 2277/2407* (2013.01); *B23D 2277/2421* (2013.01); *B23D 2277/2442* (2013.01); *Y10T 407/27* (2015.01); *Y10T 408/03* (2015.01); *Y10T 408/906* (2015.01)

(58) Field of Classification Search
CPC ............ B23C 2222/04; B23C 228/102; B23C 2228/04; B23B 2226/315

USPC .......... 408/145, 144, 227, 229, 230; 407/119, 407/118

See application file for complete search history.

(56) References Cited

U.S. PATENT DOCUMENTS

| | | | | |
|---|---|---|---|---|
| 782,111 | A | * | 2/1905 | Doederlein ................ 400/314.2 |
| 4,586,858 | A | | 5/1986 | Kubota |
| 4,705,055 | A | * | 11/1987 | Rohm et al. ................ 134/57 R |
| 4,936,721 | A | * | 6/1990 | Meyer ............................ 408/224 |
| 5,020,394 | A | * | 6/1991 | Nakamura et al. ........... 76/108.6 |
| 5,022,801 | A | * | 6/1991 | Anthony et al. .............. 408/144 |
| 5,066,170 | A | * | 11/1991 | Berryer ........................... 407/54 |

(Continued)

FOREIGN PATENT DOCUMENTS

| | | |
|---|---|---|
| CN | 101031377 | 9/2007 |
| DE | 8511133 | 6/1985 |

(Continued)

OTHER PUBLICATIONS

Written Opinion & International Search Report for PCT/US2008/080281 dated Mar. 19, 2009.

*Primary Examiner* — Eric A Gates
*Assistant Examiner* — Paul M Janeski
(74) *Attorney, Agent, or Firm* — Reising Ethington P.C.

(57) ABSTRACT

A cutting tool for machining metal workpieces using polycrystalline diamond cutting surfaces with interspersed guide surfaces and chip evacuation surfaces. When machining holes in cast aluminum alloy workpieces it is found that aluminum machining chips adhere to guide surfaces and chip evacuation surfaces and mar the machined surface. It is found that when the guide and chip evacuation surfaces are coated with a diamond-like carbon material, aluminum chips do not mar the machined surfaces.

12 Claims, 1 Drawing Sheet

(56) References Cited

U.S. PATENT DOCUMENTS

| | | | |
|---|---|---|---|
| 5,071,294 A * | 12/1991 | Suzuki et al. | 408/145 |
| 5,112,167 A * | 5/1992 | Shiga et al. | 408/211 |
| 5,236,740 A * | 8/1993 | Peters et al. | 427/249.13 |
| 5,272,940 A * | 12/1993 | Diskin | 76/108.6 |
| 5,282,705 A * | 2/1994 | Shiga et al. | 408/211 |
| 5,413,016 A * | 5/1995 | Kranz et al. | 76/108.1 |
| 5,560,839 A | 10/1996 | Bennett et al. | |
| 5,580,196 A * | 12/1996 | Thompson | 408/145 |
| 5,599,144 A * | 2/1997 | Bickham et al. | 408/144 |
| 5,651,295 A * | 7/1997 | Tumey et al. | 82/1.11 |
| 5,701,578 A * | 12/1997 | Liu | 428/565 |
| 5,716,170 A * | 2/1998 | Kammermeier et al. | 408/145 |
| 5,807,041 A * | 9/1998 | Lindblom | 408/230 |
| 5,816,754 A * | 10/1998 | Shallenberger | 408/227 |
| 5,921,727 A * | 7/1999 | Depperman | 408/144 |
| 6,152,657 A * | 11/2000 | Packer et al. | 407/32 |
| 6,170,368 B1 | 1/2001 | Oles et al. | |
| 6,402,438 B1 | 6/2002 | Boyer | |
| 6,688,817 B2 * | 2/2004 | Borschert et al. | 408/230 |
| 6,913,428 B2 | 7/2005 | Kress et al. | |
| 6,953,310 B2 * | 10/2005 | Iwamoto et al. | 407/54 |
| 6,962,751 B2 * | 11/2005 | Fukui et al. | 428/408 |
| 7,014,393 B2 * | 3/2006 | Matheis | 407/37 |
| 7,147,413 B2 * | 12/2006 | Henderer et al. | 408/144 |
| 7,296,954 B2 * | 11/2007 | Haenle | 408/227 |
| 7,311,477 B2 * | 12/2007 | Hecht et al. | 407/37 |
| 7,878,738 B2 * | 2/2011 | Kammermeier et al. | 407/114 |
| 7,896,588 B2 * | 3/2011 | Ananolli | 408/81 |
| 7,937,172 B2 * | 5/2011 | Nakayama | 700/86 |
| 2003/0118412 A1 * | 6/2003 | Fukui et al. | 407/119 |
| 2003/0133763 A1 * | 7/2003 | Kuroda et al. | 407/40 |
| 2004/0042859 A1 * | 3/2004 | Edvardsson et al. | 408/230 |
| 2004/0258493 A1 * | 12/2004 | Sugano et al. | 408/222 |
| 2005/0164620 A1 | 7/2005 | Amamoto | |
| 2007/0104953 A1 * | 5/2007 | Sugita | 428/408 |
| 2007/0256763 A1 * | 11/2007 | Ang et al. | 148/552 |
| 2008/0152445 A1 * | 6/2008 | Jensen et al. | 408/145 |
| 2009/0022561 A1 * | 1/2009 | Winebrenner | 408/230 |

FOREIGN PATENT DOCUMENTS

| | | | |
|---|---|---|---|
| DE | 10216408 | | 10/2003 |
| JP | 2001293611 A | * | 10/2001 |
| JP | 2005066703 | | 3/2005 |
| JP | 2005144640 A | * | 6/2005 |
| WO | 2005092547 | | 3/2005 |

* cited by examiner

POLYCRYSTALLINE DIAMOND CUTTING TOOL WITH COATED BODY

This application claims the benefit of U.S. Provisional Application No. 60/984,427, titled "Polycrystalline Diamond Cutting Tool With Coated Body", and filed Nov. 1, 2007.

TECHNICAL FIELD

This disclosure pertains to cutting tools for machining surfaces of aluminum alloy workpieces. More specifically, this invention pertains to a practice for coating body surfaces of such cutting tools to avoid aluminum transfer to the tool, maximize the tool life, and minimize marring of machined surfaces.

BACKGROUND OF THE INVENTION

Many articles of manufacture are made from metal castings with surfaces that are machined to a specified shape and to specified dimensions. Often such machining includes drilling or finishing of holes in the preformed body. Many automotive vehicle powertrain components are made of aluminum alloy castings that require hole drilling or hole finishing operations. Reaming is an example of a hole finishing operation. In this operation, a small amount of stock is removed from the inner diameter of the hole with a special tool called a reamer. Reamers are used in finishing operations for holes in cast aluminum alloy valve bodies for vehicle transmissions and in engine cylinder blocks and cylinder heads. The range of cutting operations is wide, requiring the use of many cutting tools and metal machining operations. The design of the cutting tools is important in maintaining machining operations without stopping for tool replacement or tool refurbishing.

Cutting tools with polycrystalline diamond inserts are used widely in machining of aluminum, its alloys, and other nonferrous materials. In particular, round rotatable cutting tools with polycrystalline diamond (PCD) inserts are used in finishing operations to machine holes in aluminum alloy castings to final dimensions and roundness. The PCD insert is a body that provides a hard, durable cutting tip or edge for a machining operation. PCD-tipped tools are typically formed of a body of strong tool steel or metal carbide composition with one or more pairs of PCD cutting edges. The PCD cutting inserts comprise an inter-grown mass of randomly oriented, hard diamond particles sintered in a suitable matrix material. The cutting edges formed by the hard PCD material improve the effective life of the cutting tool and provide a better surface quality.

In addition to the PCD cutting edges, the tool body (for example, a tool intended to rotate in shaping a hole) may also have guide surfaces and/or edges that help position the tool with respect to the workpiece and reduce the tool round out. In particular, a PCD-tipped reamer may have surfaces and/or edges that follow the finished hole and help maintain concentricity of the tool and the hole, while the cutting surfaces remove aluminum alloy chips or particles. Sometimes these reamers have one or more pairs of radially extending guide surfaces and/or edges. In other cases, these reamers may have three radially extending guide surfaces and/or edges. The reamers are usually machined so that the guide surfaces and/or edges follow closely the machined hole but do not damage it and do not remove additional material. This is achieved by making the diameter of the guiding surfaces and/or edges a few microns smaller than the diameter of the PCD cutting edges. Guide surfaces and/or edges on a rapidly rotating tool engage and follow along the machined surface and reduce vibration of the cutting tool.

In addition to the guide surfaces and/or edges and the PCD cutting edges, the tool may also have chip evacuation surfaces to evacuate chips along the tool body and from the hole being cut. In reamers, these surfaces form flutes and sometimes have the shape of a circular spiral groove in the body of the tool. In other cases, these surfaces may be straight. In still other cases, these surfaces may have a combination of spiral and straight surfaces.

Thus, during the operation of the cutting tool, aluminum alloy chips are removed from the machined surface by the PCD cutting edges and removed from the cutting zone by sliding along chip evacuation surfaces. Sometimes, however, aluminum chips accumulate momentarily on the rotating guide surfaces and/or edges or chip evacuation surfaces. When chips adhere to and accumulate on the chip evacuation surfaces, the passages for the sequential chips are obstructed, resulting in material buildup, which scratches and/or mars the surface being machined. This accumulation of debris on tool surfaces is more rapid when the tool has been used for a period of time and has been worn. Left uncorrected, this accumulation of debris on tool surfaces can lead to decreased surface quality of the machined holes and/or to breakage of the tool. Thus, this condition may require untimely refurbishing of the cutting tool.

The cutting speeds are usually high during machining with PCD cutting tools. As a result, the removed chips are hot, which increases the probability that the chip will adhere momentarily to the non-cutting tool surfaces, such as guiding surfaces and/or edges or chip evacuation surfaces, resulting in chip accumulation and marring the surface. There is a need to minimize accumulation of aluminum material on guide surfaces and/or chip evacuation surfaces of PCD cutting tools.

SUMMARY OF THE INVENTION

A representative cutting tool may, for example, be a reamer, a tool that is rotated for enlarging or shaping holes. The body of the tool may be formed of a high-speed tool steel or a cemented carbide. The cemented carbide material may be made by sintering particles of tungsten carbide using cobalt as a binder.

When the reamer is used for finishing holes in aluminum, it may be shaped to have a holder portion and cutter body portion. The holder portion of the cutting tool is placed and secured in the spindle of a powered machine that locates and rotates the cutting tool. The cutter body portion of the tool carries opposed polycrystalline diamond (PCD) cutting edges that remove stock from the inner diameter of a hole in the workpiece in a metal removing cutting operation.

In an embodiment of this invention the guide surfaces/edges and the chip evacuation surfaces of the cutting tool are coated with a hydrogenated diamond-like carbon (DLC) material. It is found that the aluminum chips do not stick to the diamond-like carbon material and the chips are carried away from the machined surface and out of cutting zone by the rotating tool and machining fluid or by other means.

In one DLC coating embodiment of the invention, the whole body of the tool is coated with a film of hydrogenated diamond-like carbon material. Since the temperature and local wear is the highest near the cutting edges, and since the DLC is much softer than the PCD cutting edge, the DLC is readily abraded from the vicinity of the polycrystalline diamond cutting edges of the tool. More importantly, however, the adherent DLC coating remains on the guide surfaces and edges, chip evacuation surfaces, and other cutter body surfaces of the tool, where the temperatures and the pressures are much lower. As the aluminum chips do not adhere to the DLC coating, the cutting operations may be continued for longer operating periods without tool refurbishing.

Diamonds consist of true, long range crystalline (generally of cubic crystal structure) arrangements of carbon atoms which have $sp^3$ bonds. Generally diamond-like carbon materials are amorphous, mixed clusters of carbon atoms connected with $sp^2$ and $sp^3$ bonds. In hydrogenated diamond-like carbons, hydrogen atoms are bonded to some of the carbon atoms. The hydrogenated diamond-like carbon materials are often somewhat softer and more flexible than hydrogen-free amorphous carbons, and more chemically inert to aluminum. These diamond-like carbons may be prepared by different suitable methods. For example, plasma assisted chemical vapor deposition techniques employing radio frequency or direct current glow discharges in hydrocarbon gas mixtures produce smooth amorphous carbon and hydrocarbon films which have mixed $sp^2$ and $sp^3$ bonds. The films may be deposited on substrates such as cutting tool bodies. Other methods may be used to deposit hydrogenated diamond-like carbon films on cutting tool bodies in the practice of this invention. These adherent and durable carbon films serve as slippery pathways to shed and evacuate aluminum machining chips and exclude adhesion of aluminum to the tool, thus minimizing the scoring of the machined aluminum alloy surface.

Other objects and advantages of the invention will be apparent from a description of further illustrative embodiments of the invention which follow.

DESCRIPTION OF PREFERRED EMBODIMENTS

When many like machining operations are being performed with metal cutting tools on like workpieces it is often a manufacturing strategy to employ tool designs and materials that enable many repeated machining operations to be performed before it is necessary to refurbish the tool. The selection of the tool shape and material will often depend on the composition of the metal workpiece. This invention pertains to such tool designs and materials.

Practices of this invention are applicable to cutting tools that have a combination of cutting edges and non-cutting surfaces and edges. Examples of the non-cutting surfaces and edges include guide surfaces or edges and chip-evacuation surfaces. According to one embodiment, the non-cutting surfaces of the tool may be coated with DLC. In cutting tools, the cutting surfaces remove metal chips from a workpiece surface. The guide surfaces space the tool from the workpiece surface. The chip evacuation surfaces provide paths for chip evacuation from the cutting zone.

The tool may be made of a suitably hard metal such as high speed steel, a tool steel, or a metal compound such as tungsten carbide. The cutting surfaces of the tool may have a brazed, relatively thin, deposit of polycrystalline diamond material for prolonged tool life. This deposit for cutting is sometimes called an "insert." Obviously, the tool may be formed in many different shapes and other materials may be used in making the cutting tool. In various embodiments, the tool may be, for example, but not limited to, a drill, reamer, milling cutter, boring tool, or lathe cutter.

Figure 1:
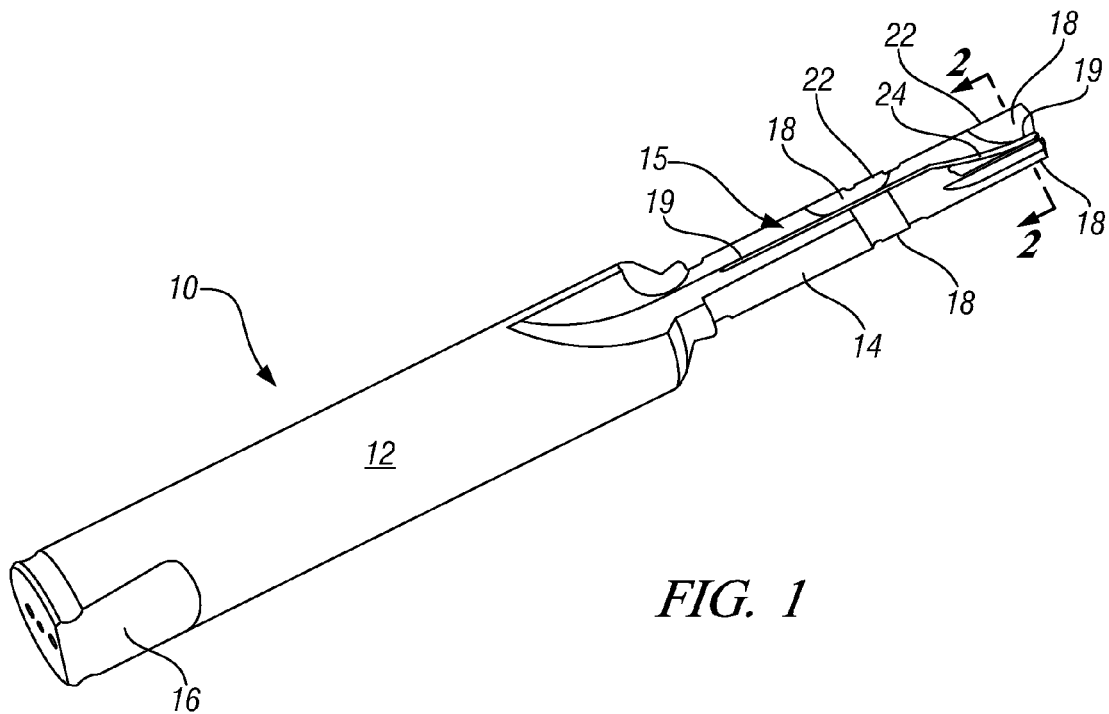
FIG. 1 is an axonometric drawing of a reamer illustrating cutting surfaces, chip evacuation surfaces and guide surfaces.
Figure 2:
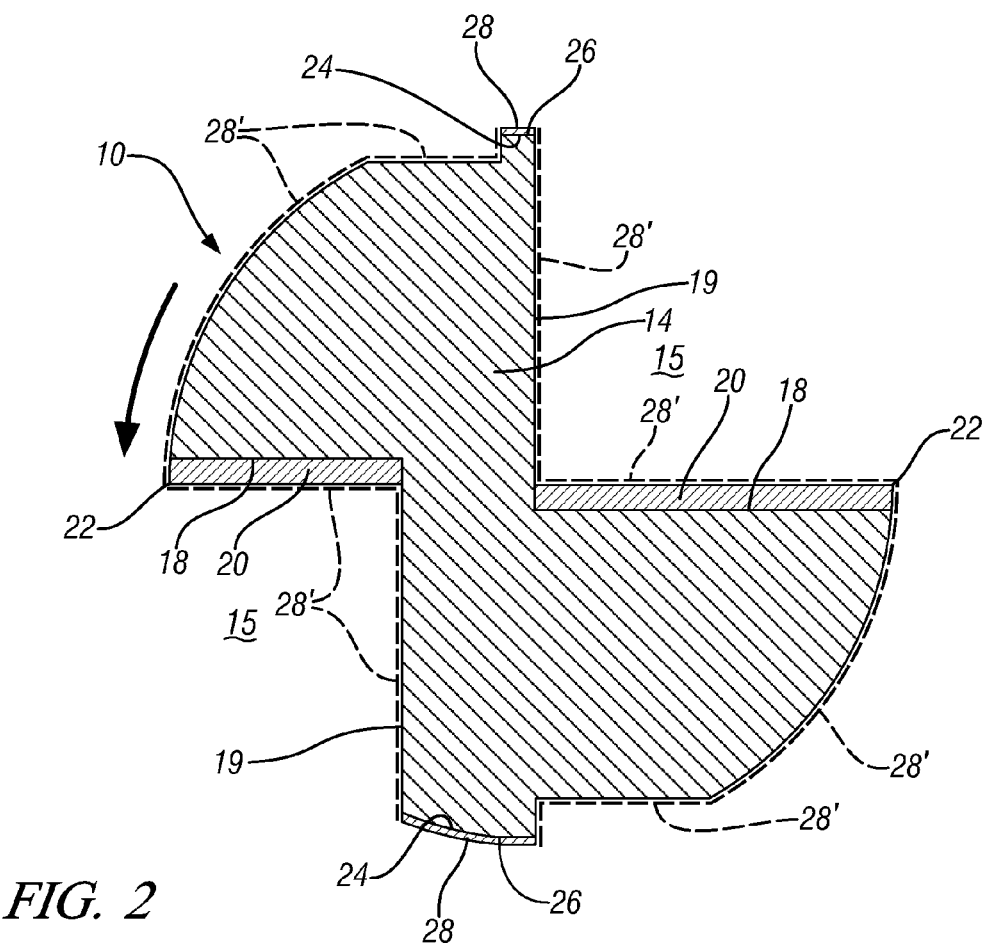
FIG. 2 is a cross-section of the cutting tool of FIG. 1, taken at 2-2, illustrating the location of diamond-like coating on guide surfaces of the tool.

In one embodiment, the tool may be a rotating reamer. The reamer may be used for finishing holes in a metal workpiece such as an aluminum alloy casting of an automotive vehicle transmission valve body, a vehicle cylinder block, or a cylinder head. Such a reamer is illustrated in FIGS. 1 and 2. FIG. 1 presents an axonometric view of the reamer. FIG. 2 presents a cross-sectional view of a portion of the cutting tip of the reamer 10 taken along line 2-2 of FIG. 1. The reamer 10 may rotate in a counter-clockwise direction as shown by the arrow in FIG. 2.

Referring to FIG. 1, reamer 10 has a round holder portion or shank 12 with a center of rotation and with an axially extending cutter body 14. The reamer 10 is designed and shaped for finishing (to a specified roundness and dimension) many like holes in aluminum alloy castings. Except as described below, holder portion 12 and cutter body 14 are formed as a single piece, suitably of sintered tungsten carbide, or the like. The round holder portion 12 is adapted to be secured by chuck jaws of a powered rotary machine, not shown. Holder portion 12 may have a flat surface 16 for engagement by the rotating spindle of the machine to prevent slippage of the reamer in the holding mechanism of the machine. Cutting edges 22 are provided to remove aluminum chips as the reamer 10 is rotated in a hole in a casting.

Referring to FIGS. 1 and 2, the cutter body 14 is shaped with a set of opposed slots or grooves 15, also called chip evacuation flutes. As best seen in FIG. 2, flutes 15 are formed by the removal of arcuate portions along the axis of the cutter body. Flutes 15 have flat radial surfaces 18 and 19 that shape the flutes and provide chip evacuation surfaces in impellers. The radial chip evacuation surfaces 18 and 19 may extend from a center portion of the tool to the outer circumference of cutter body 14. In operation of the tool, the flutes 15 may also be confined by the surface of the machined hole in the workpiece.

As seen in FIG. 2, a layer 20 of sintered polycrystalline diamond material (PCD) is attached to the chip evacuation surface 18 of the chip evacuation flute 15. The outermost corners of the PCD layers 20 form the cutting edges 22 of the reamer 10. The cutting edges 22 remove aluminum chips (not shown) which are carried along the PCD layer 20 and axially along the chip evacuation surface 18 of the chip evacuation flute 15, and eventually out of the machined hole.

Cutter body 14 is also shaped with two diametrically opposed guides 24. One guide 24 is shown in FIG. 1 and both guides 24 are seen in FIG. 2. In this embodiment, guides 24 are spaced ninety degrees from cutting edges 22. The diameter of guides 24 is made a few microns smaller than the diameter swept by the cutting edges 22. The diameter of guides 24 may be, for example, six microns smaller than the diameter swept by the cutting edges, leaving a gap of three microns between the machined hole surface and the guides 24 on each side of the reamer 10.

In a machining operation, the reamer 10 is rotating (e.g., at 4,000 to 10,000 rpm) in a workpiece hole. As the cutting edges 22 engage the workpiece, the cutter body 14 flexes and the guides 24 come into contact with workpiece surfaces and machine chips.

In accordance with this invention, the outer radius surfaces 26 of the guide 24 are provided with a coating 28 of DLC material. In preferred embodiments of the invention, a hydrogenated diamond-like carbon material is deposited on the outer surfaces 26. Preferably, the thickness of the coating 28 is between one and three microns.

In many embodiments of the invention the DLC material will be deposited from a vapor using plasma. In such embodiments, it may be easier and preferred to coat much of the outer surface of the cutter body 14. Such extended coating is indicated by dashed line coating 28' in FIG. 2. DLC coating 28' is not shown in FIG. 1 for more clarity in illustration of cutter body 14 and its features. Extended coating 28' may also be applied over the polycrystalline diamond layer 20. But any DLC coating 28, 28' on the polycrystalline diamond layer 20 may be gradually abraded away and removed from the machined hole.

A function of DLC coating 28, 28' on cutter body 14, including guides 24 and flute 15 (which also serves to evacuate the chips), is to minimize sticking of aluminum machining chips. It is found that when aluminum chips are wedged between the guides 24 and the machined hole surface, or between chip evacuation surfaces 18 and the machined hole surface, then scoring or other damage to the finished surface of the hole may occur. DLC coating 28, 28' permits the aluminum chips to slide over cutter body 14 surfaces (including guides 24 and flutes 15) and be removed from the machined hole.

The DLC coating acts like a low friction coating to which aluminum chips display low adhesion during metal cutting of aluminum and aluminum alloy surfaces. There are other low-friction coating materials that may be employed in place of DLC or in combination with DLC on cutter tool bodies to prevent the build up of aluminum machining chips as a result of adhesion with the cutting tool surfaces. For example, metal-containing diamond-like carbon coatings, titanium diboride ($TiB_2$) coatings, or nanocomposite tungsten carbide/carbon coatings may be applied to a cutting tool body to facilitate removal of aluminum machining chips and minimize their accumulation on cutting tool surfaces.

Practices of the invention have been shown by examples that are presented as illustrations and not limitations of the invention.

The invention claimed is:

1. A rotatable hole-forming tool for machining aluminum alloy workpieces, the tool having an axis of rotation and a rounded external surface, the tool comprising:
   an elongated one-piece tool body comprising a tool holder portion and a hole-forming portion, each centered on the axis of rotation of the tool;
   the hole-forming portion having a length for forming holes in workpieces, the hole-forming portion having a rounded external surface with one or more distinct regions along the hole-forming portion length, and an end surface for initial engagement with a workpiece, the rounded external surface of the hole-forming portion being formed with at least two inwardly-extending, opposing, V-shaped channels, each V-shaped channel being defined by two intersecting surfaces, a flat channel surface and a second channel surface, each of the channel surfaces being spaced apart at the external surface of the hole-forming portion and each surface extending inwardly from the external surface of the hole-making portion to intersect in an inner channel edge that extends parallel to, or along, the axis of rotation of the tool over a portion of the hole-forming portion of the tool body;
   the flat channel surface of each V-shaped channel having a first, brazed-on, aluminum-cutting, layer of sintered polycrystalline diamond (PCD), the first aluminum-cutting layer extending along a portion of the axial length of the first flat channel surface such that the first aluminum-cutting layer provides a drilling edge at an end surface for making a hole in a workpiece, and a reaming edge at the external surface of the hole-forming portion to size the hole formed by the drilling edge and to finish the surface of the hole;
   the second surface of each V-shaped channel intersecting the external surface of the hole-forming portion in an external surface region of the hole-making portion that is free of cutting edges or channels, and is diametrically smaller than the opposing cutting edge at the external surface of the hole-forming portion, the external surface region adjacent the edge of the second channel surface serving as a guide surface for the tool; and
   each aluminum-cutting PCD layer, each first and second channel surface, and the external surface of the hole-forming region of the tool being coated with a friction-reducing layer for lubricating the rotation of the tool in the workpiece and promoting the flow of aluminum chips, produced by the rotating cutting edges of the tool, along the surfaces of each channel toward the tool holder portion of the hole-forming tool, the thickness of the friction-reducing layer having a range of from one to three micrometers.

2. The rotatable hole-forming tool recited in claim 1 in which the friction-reducing layer is diamond-like carbon.

3. The rotatable hole-forming tool recited in claim 1 in which the friction-reducing layer is hydrogenated diamond-like carbon.

4. The rotatable hole-forming tool recited in claim 1 in which the flat surfaces of the first and second V-shaped channels extend inwardly into the tool body by unequal distances.

5. The rotatable hole-forming tool recited in claim 1 in which the tool comprises one or more additional, brazed-on, aluminum-cutting, PCD layers of sintered polycrystalline diamond for providing additional cutting edges in the cutting portion of the tool, the one or more additional PCD layers being distanced from the first cutting layer and brazed to one or more flat channel surfaces.

6. The rotatable hole-forming tool recited in claim 5 in which the one or more additional cutting edges engage the cylindrical surface of the hole made by the one or more end cutting edges, the additional cutting edges being sized and adapted to enlarge the diameter of at least a portion of the cylindrical surface of the hole.

7. The rotatable hole-forming tool recited in claim 1 in which each of the channels is of varying cross-section along the length of the channel as it extends from the end of the hole-forming portion of the tool.

8. The rotatable hole-forming tool recited in claim 7 in which the channel extends into the tool holder portion of the tool body.

9. A rotatable hole-forming tool adapted for machining aluminum and aluminum alloys, the tool comprising:
   an elongated one-piece tool body with an axis of rotation and a rounded external surface, the body comprising, on an end, a hole-making portion with a length, and on a second end, a tool holder portion, the hole-making portion comprising a drill portion and one or more reamer portions, each of the drill and reamer portions comprising one or more polycrystalline diamond (PCD) cutting edges;
   two flutes for evacuation of cutting chips from the cutting edges and transport of cutting chips along the tool axis, the flutes extending the length of the hole-making portion and, optionally, further extending part-way into the tool holder portion, each flute comprising a drill flute portion, a reamer flute portion and a transition flute portion, each of the flute portions having a length and the transition flute portion being positioned between, and connecting, the drill flute portion and reamer flute portion;

the drill and reamer flute portions each being bounded by a first, flat surface extending inwardly from the surface of the hole-making portion and comprising one or more brazed-on PCD layers having cutting edges, and a second surface extending inwardly from the surface of the holemaking portion and intersecting the first surface at an inner flute edge, at least a portion of the inner flute edge being parallel to the tool axis, the first and second surfaces defining, at each location along the length of the flute, a flute cross-sectional area, the cross-sectional area of the reamer flute portion being less than the cross-section of the drill flute portion and the area of the transition flute portion of the flute varying along its length, the transition flute portion being bounded by the first flat surface and a second surface arranged to smoothly transition the second flute surface between the second flute surface of the drill portion into the second flute surface of the reamer portion;

each of the drill and reamer portions having two, generally-opposing, unequal length, guide surfaces, each of the surfaces of the drill portion guide surfaces being offset inwardly by about 3 micrometers from the surface of the swept surface of the drill cutting edges and each of the surfaces of the reamer portion guide surfaces being offset inwardly by about 3 micrometers from the swept surface of the corresponding one or more reamer cutting edges; and, at least the bounding surfaces of the flutes being coated with a single layer of a lubricious coating, the coating serving to inhibit adherence of aluminum or aluminum alloy machining chips to the flute surfaces, the coating thickness having a range of from one to three micrometers.

10. The hole-forming tool recited in claim 9 in which the lubricious coating layer is diamond-like carbon.

11. The hole-forming tool recited in claim 9 in which the lubricious coating layer is hydrogenated diamond-like carbon.

12. The hole-forming tool recited in claim 9 in which the cutting edges and guide surfaces are coated with the lubricious coating layer.

* * * * *